April 11, 1939.  J. M. HOTHERSALL ET AL  2,153,561
COATING MACHINE
Filed June 24, 1937   9 Sheets-Sheet 6
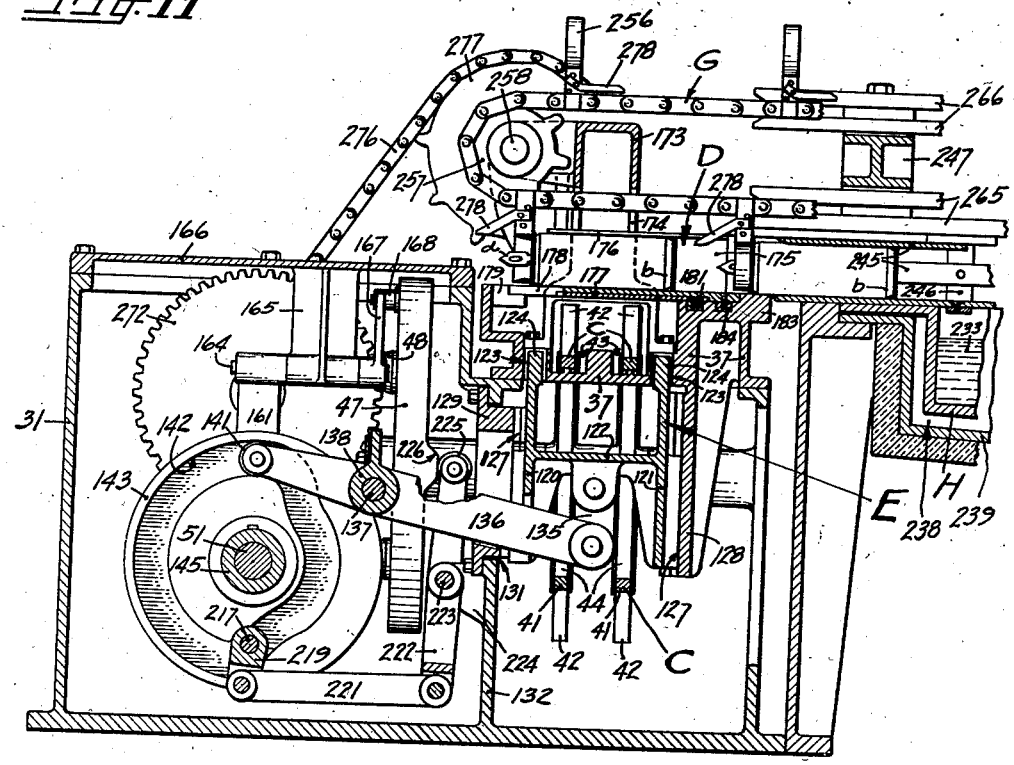
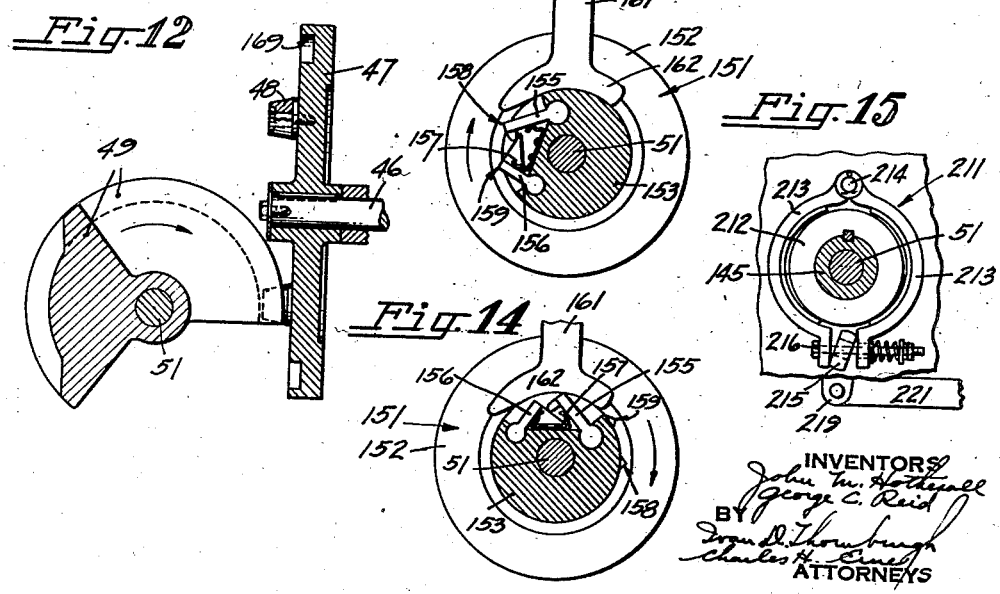

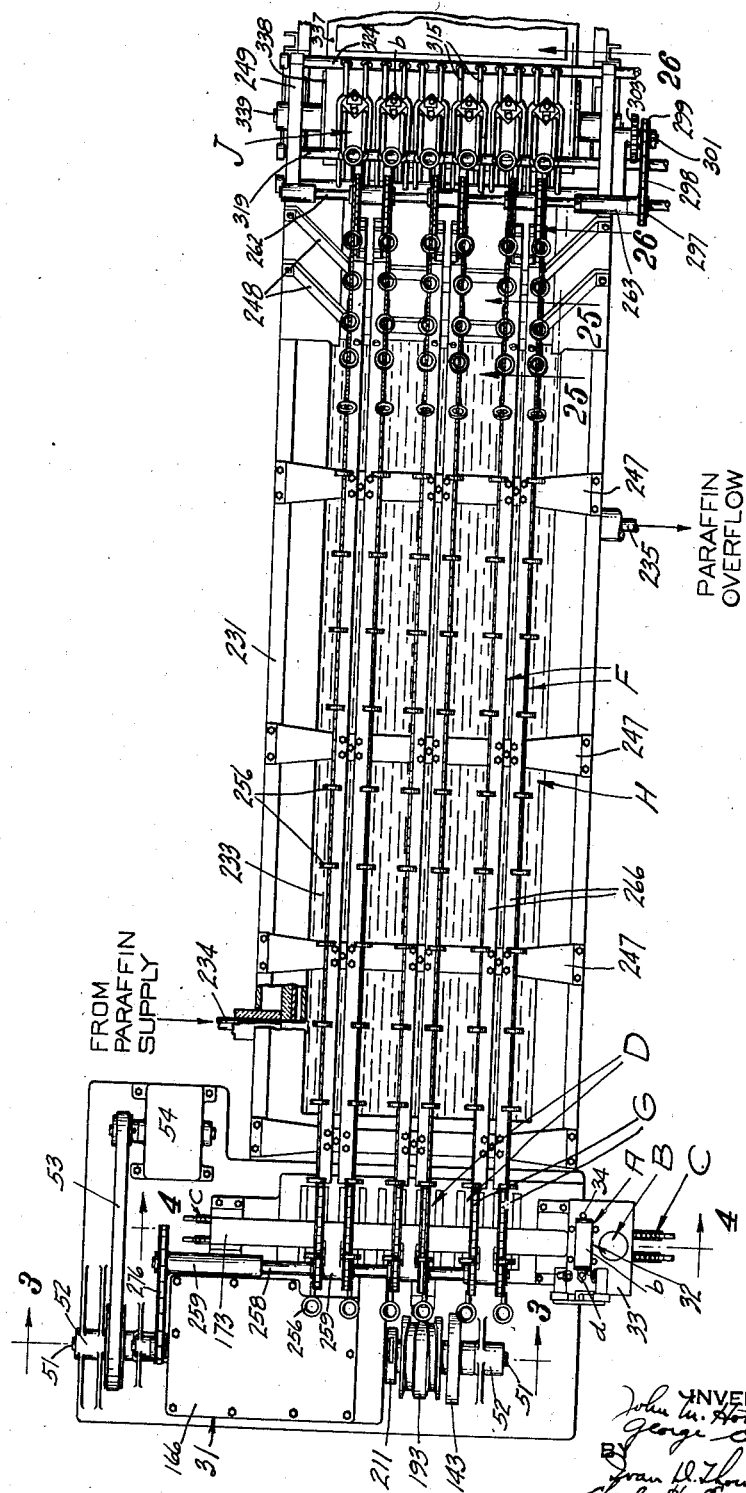

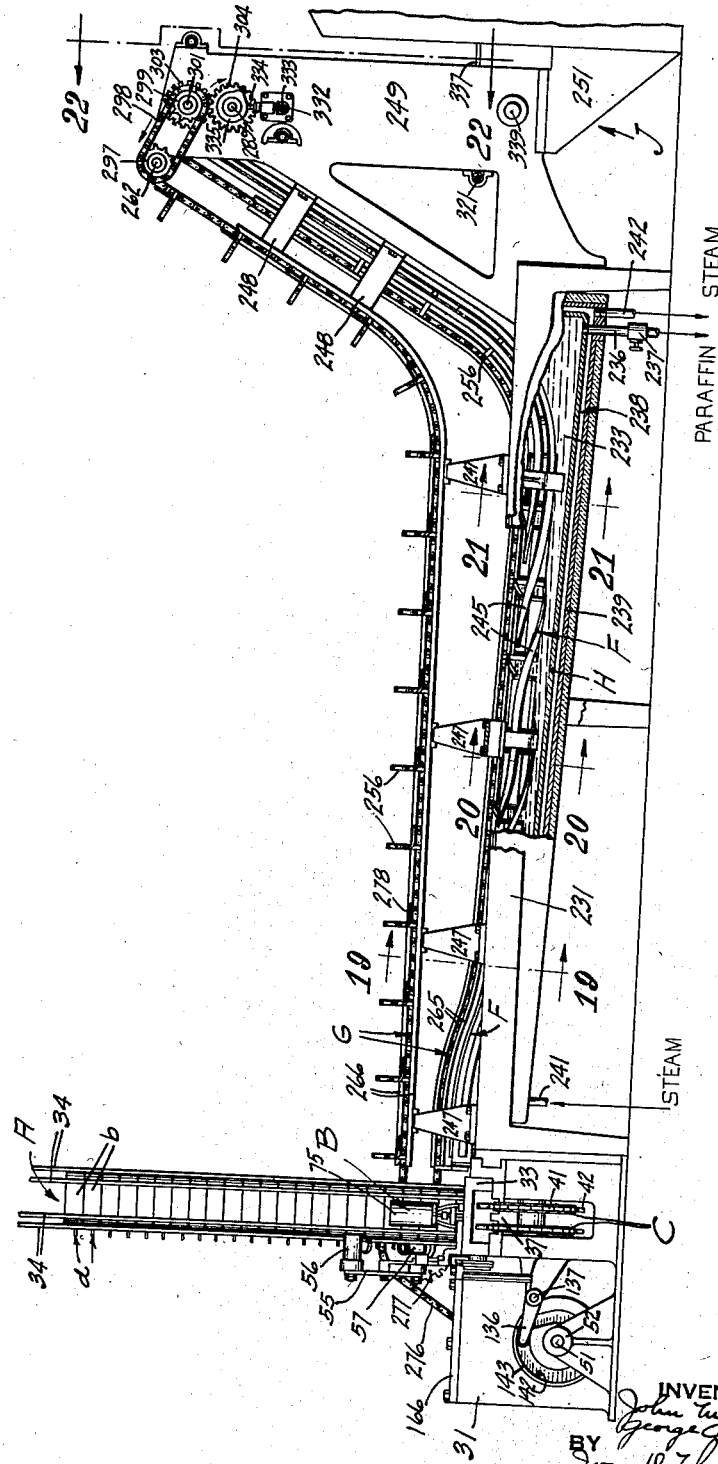

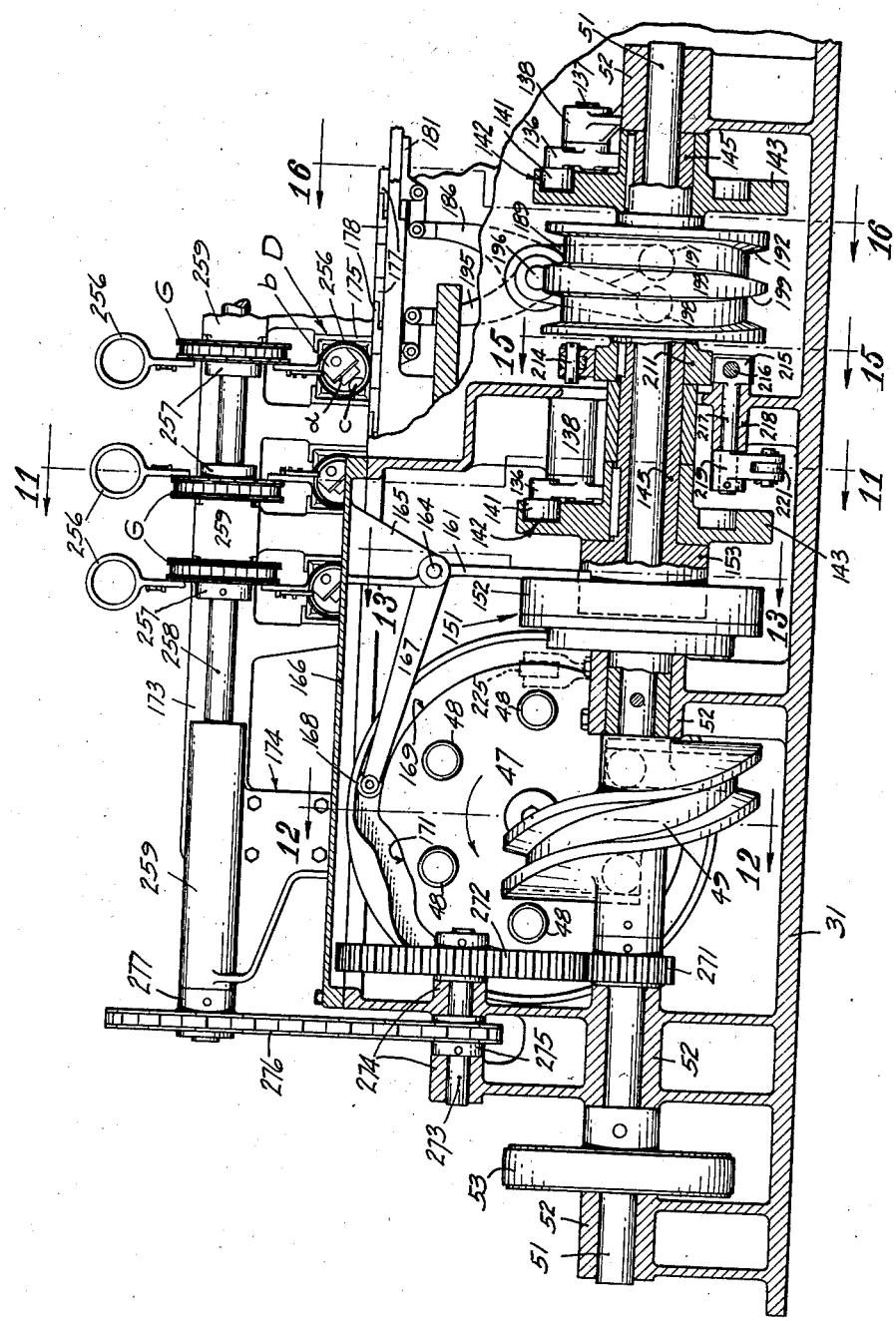

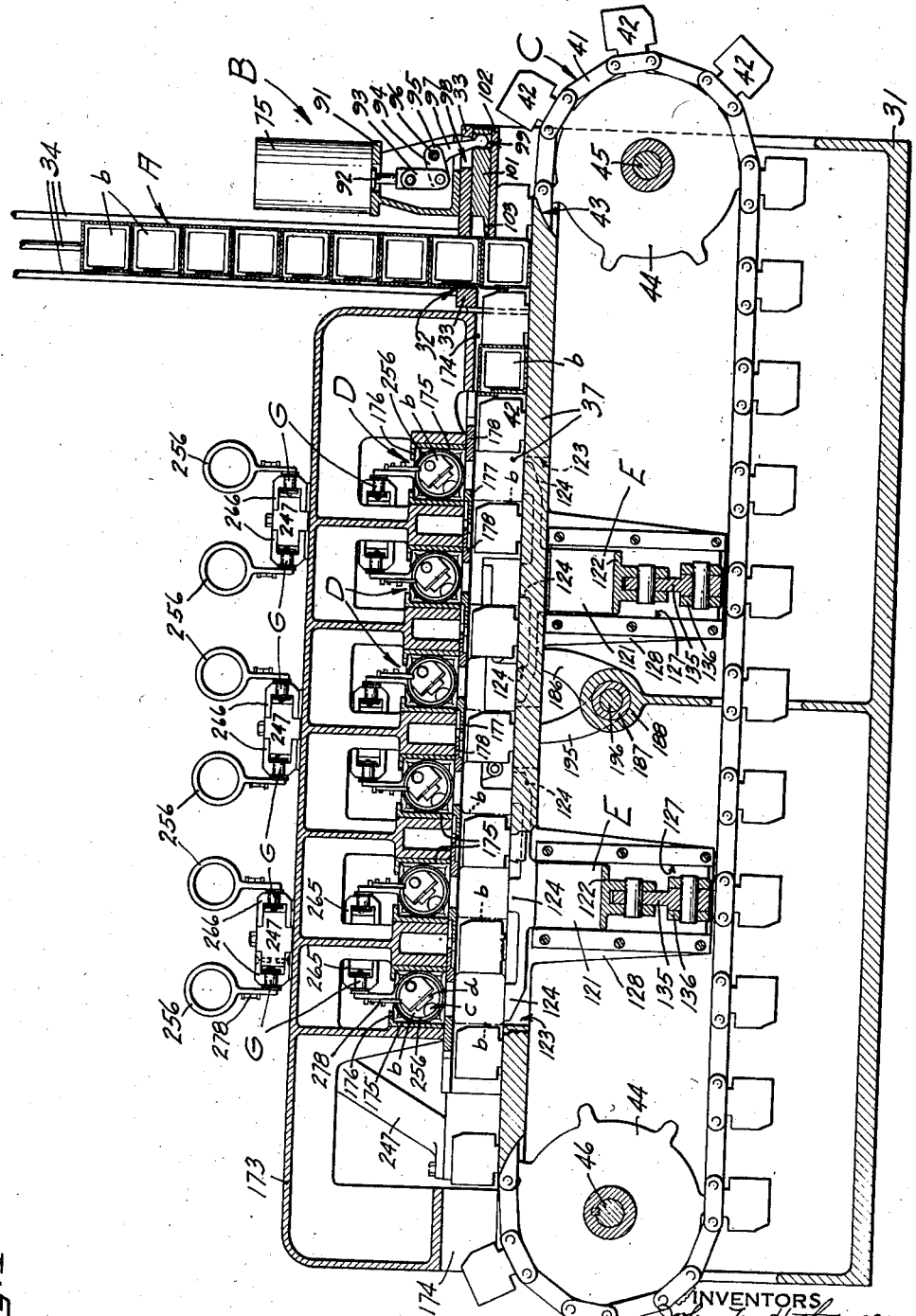

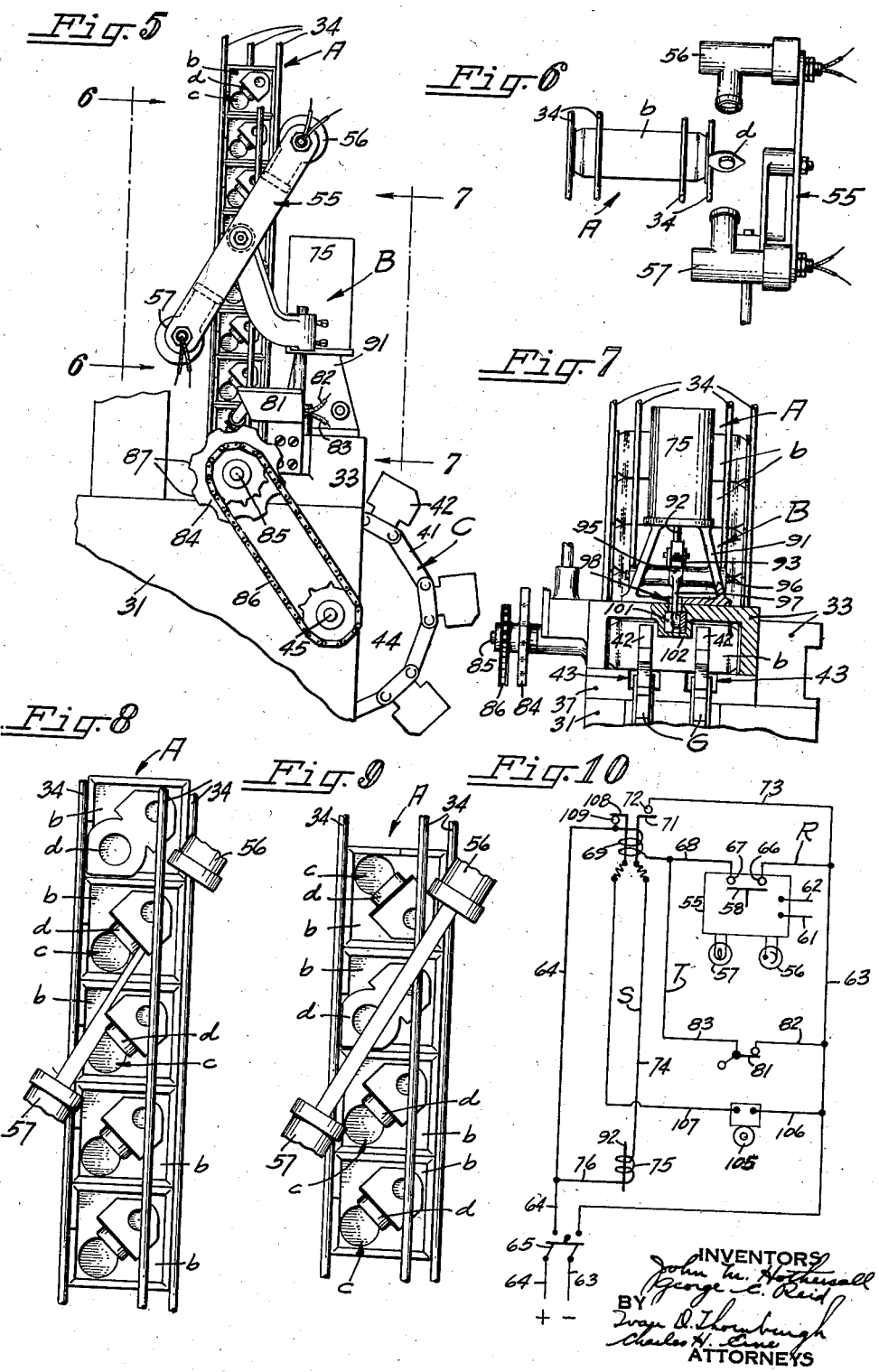

April 11, 1939.  J. M. HOTHERSALL ET AL  2,153,561
COATING MACHINE
Filed June 24, 1937  9 Sheets-Sheet 7
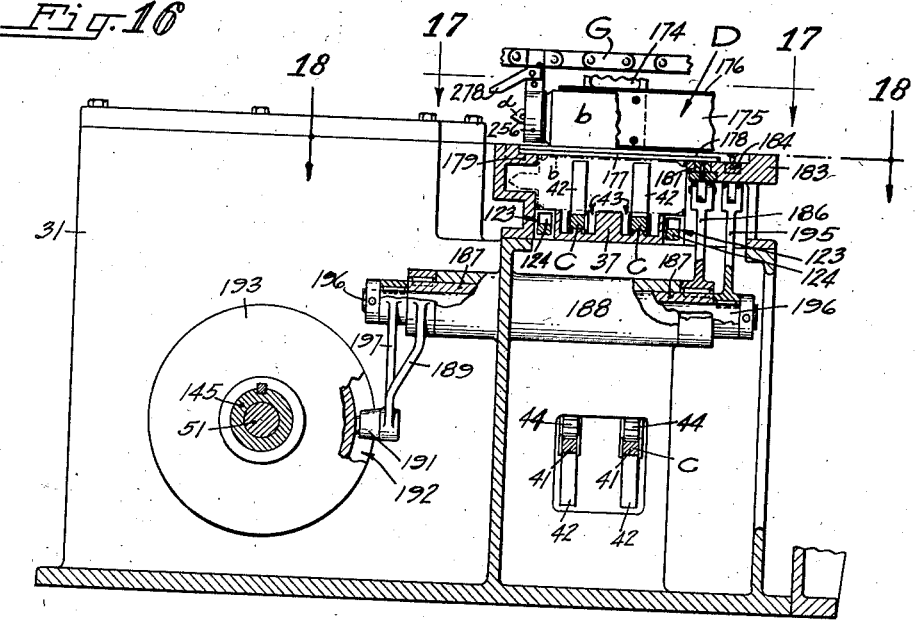
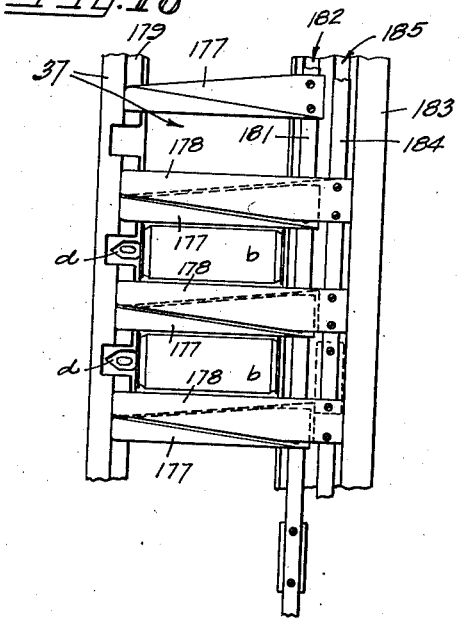
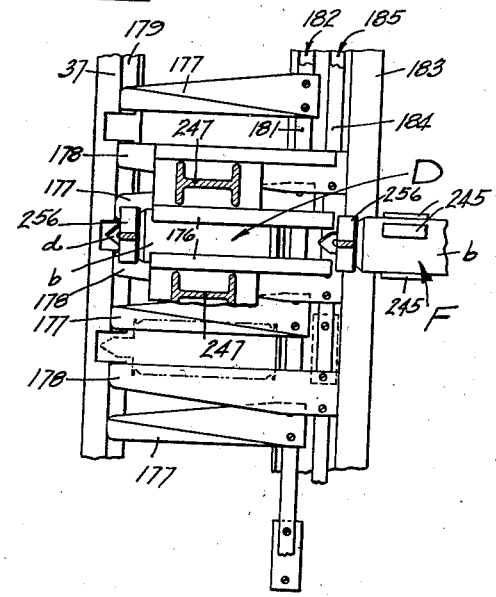
INVENTORS
BY
ATTORNEYS

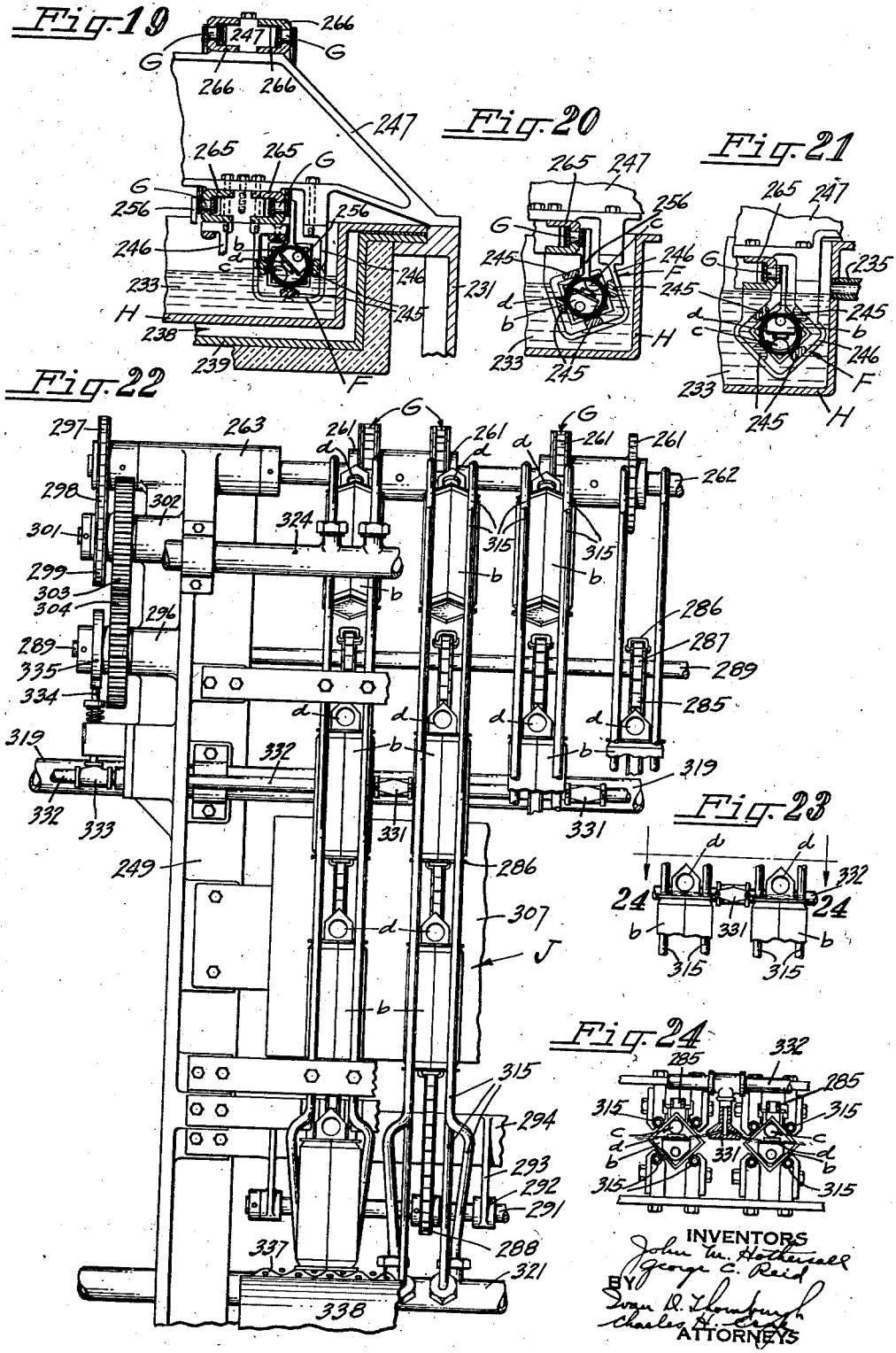

April 11, 1939.  J. M. HOTHERSALL ET AL  2,153,561
COATING MACHINE
Filed June 24, 1937  9 Sheets-Sheet 9
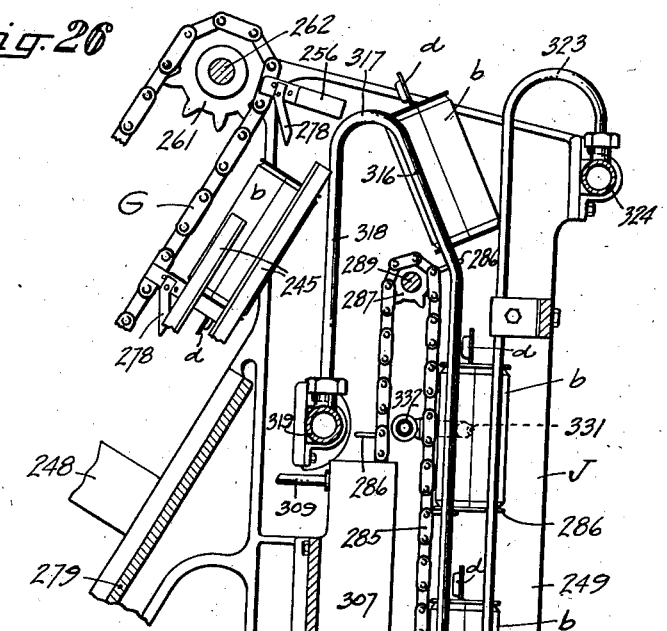
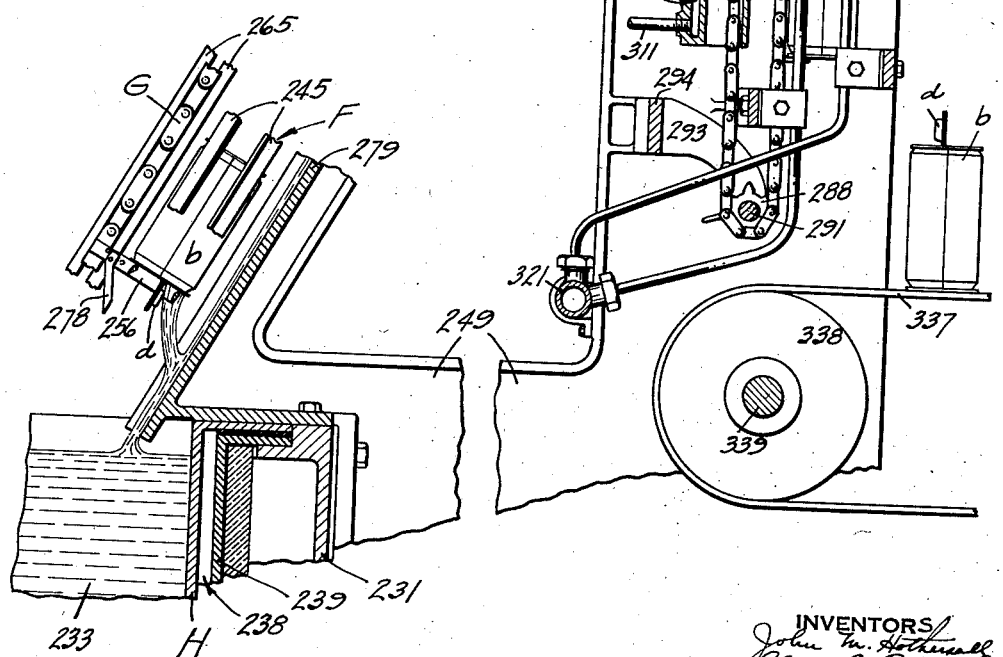

Patented Apr. 11, 1939

2,153,561

UNITED STATES PATENT OFFICE 2,153,561

COATING MACHINE

John M. Hothersall and George C. Reid, Brooklyn, N. Y., assignors to American Can Company, New York, N. Y., a corporation of New Jersey Application June 24, 1937, Serial No. 150,174

14 Claims. (Cl. 91—46)

The present invention relates to container or can coating machines and has particular reference to a machine for sterilizing and liquid proofing the interior and exterior surfaces of fibre cans having restricted end openings, a preferable liquid proofing material being molten paraffin or the like.

An object of the invention is the provision of a machine for sterilizing and liquid proofing fibre cans having restricted end openings wherein the cans are immersed in a bath of melted paraffin maintained at sterilizing temperatures, are rotated on their longitudinal axes while in the bath to distribute the sterilizing and liquid proofing paraffin on all surfaces, are drained of excess paraffin as the cans are removed from the bath and are thence delivered onto a discharge conveyor for proper cooling.

Another object is the provision in such a machine of feeding devices which receive individual cans successively from a single source of supply and which introduce them in groups, preferably as a row of cans, into the bath of coating material and thence advance them in a continuously moving procession, the feeding devices being particularly adapted to handle cans having attached closure elements arranged in a predetermined open position.

Still another object is the provision in such a machine of instrumentalities for detecting the open or closed condition of cans having attached closure elements and for stopping the feeding of a can if its closure element is in other than a predetermined open position.

A further object is the provision in such a machine of can discharge devices which keep the cans warm while being discharged and therefore prevents premature chilling or uneven cooling of the hot coating on portions of the cans which necessarily must engage against the discharge devices.

Numerous other objects and advantages of the invention will be apparent as it is better understood from the following description, which, taken in connection with the accompanying drawings, discloses a preferred embodiment thereof.

Referring to the drawings:

Figure 1 is a top plan view of a machine embodying the instant invention;

Fig. 2 is a side elevation of the machine of Fig. 1, with parts broken away and parts shown in section;

Figs. 3 and 4 are enlarged transverse sections taken substantially along the respective lines 3—3 and 4—4 in Fig. 1;

Fig. 5 is an enlarged front elevation of the can magazine and can detector device showing a fragmentary portion of the machine base;

Figs. 6 and 7 are elevational details of parts of a portion of Fig. 5 as viewed substantially along the respective planes indicated by the lines 6—6 and 7—7 in that figure, a small part of Fig. 7 being sectioned;

Figs. 8 and 9 are enlarged fragmentary details of Fig. 5 showing different positions of the cans in the can magazine;

Fig. 10 is a wiring diagram of the electric instrumentalities and circuits used in the machine;

Fig. 11 is a longitudinal section of one end of the machine as taken substantially along the broken line 11—11 in Fig. 3;

Figs. 12, 13, 14 and 15 are sectional details taken substantially along the respective vertical lines 12—12, 13—13, and 15—15 in Fig. 3, Fig. 14 being a similar sectional view to Fig. 13 with the same parts shown in a different position;

Fig. 16 is a longitudinal section taken substantially along the broken line 16—16 in Fig. 3, with parts broken away;

Figs. 17 and 18 are respectively fragmentary sectional and plan details taken substantially along the respective horizontal lines 17—17 and 18—18 in Fig. 16;

Figs. 19, 20 and 21 are enlarged fragmentary sections taken substantially along the respective vertical lines 19—19, 20—20 and 21—21 in Fig. 2;

Fig. 22 is an enlarged fragmentary elevation of one end of the machine as viewed along a plane indicated by the broken line 22—22 in Fig. 2, a connecting belt shown in the lower portion of the view being in section;

Fig. 23 is a fragmentary detail of features of Fig. 22 and showing the upper ends of certain of the cans in a different position;

Fig. 24 is also a fragmentary detail as viewed from a horizontal plane indicated by the line 24—24 in Fig. 23, parts being broken back and shown in section; and Figs. 25 and 26 are enlarged fragmentary longitudinal sections taken substantially along the respective lines 25—25 and 26—26 in Fig. 1.

The present invention contemplates the sterilizing and liquid proofing of cans both on the outside and on the inside, and is particularly adapted for cans which are entirely closed with the exception of a small filling and dispensing opening which permits operation on cans the interior of which is difficult to get at. Such a dispensing opening is to be closed and sealed after filling. However, the machine herein disclosed is equally well adapted to sterilize and liquid proof any other type of can such as one having a fully open end or mouth.

An exemplary form of can having a restricted opening is illustrated in the drawings and is indicated by the letter b (Figs. 1 and 2). This can is preferably of the tall, square cross-section variety which today is gaining great favor for holding milk. Can b is preferably made of fibre board and is provided with fibre top and bottom end members. The top end member may be formed with a filling and dispensing opening c (see also Figs. 6, 8 and 9) which is disposed adjacent an edge of the can and which is adapted to be sealed with a hinged closure element d securing. This closure element should be fully open during the liquid proofing step and the opening c should be in a predetermined position when the can enters the machine.

In the machine illustrated in the drawings as a preferred embodiment of the invention, the cans b are received in a horizontal position from any suitable source of supply, such as for example, a can and end assembling machine and as received are stacked one above the other in a magazine A (Figs. 1 and 2). A can detecting device B is used and is located adjacent the magazine A. Such a device detects cans which are not properly positioned within the magazine or cans having the closure element d in other than a fully open position.

Properly positioned cans are individually picked off from the bottom of the stack in magazine A by an intermittently moving can carrier C. Carrier C spaces and advances the cans transversely of the machine bringing a row of cans into vertical alignment with and beneath a plurality of can receiving instrumentalities or pockets D (see also Fig. 4) which are located just above the carrier. The row of cans when so aligned is raised vertically as a group by lifter devices E and the cans are inserted into the can receiving pockets D. When in the pockets the cans are in longitudinal alignment with the receiving ends of a plurality of spaced and parallel runways F which extend longitudinally of the machine and into which the cans are transferred for further advancement.

Cans entering the runways F are advanced by a conveyor G and are passed down into a reservoir or tank H containing liquid paraffin which is maintained at a sterilizing temperature. Here the cans are immersed in and filled with the liquid and are rotated on their longitudinal axes as they are propelled through the liquid so that all can surfaces inside and outside including the surfaces of the attached closure element are completely covered with the paraffin.

The coated cans are then carried up out of the liquid by the conveyor G in an inclined and inverted position with their openings c at the bottom and with the adjacent corner in lowermost position. This permits excess paraffin to drain away from both interior and exterior walls of the cans. It is for the purpose of effecting complete drainage of the can at this stage that the can when it first entered the machine was detected for proper position of its opening c and closure element d.

When fully drained the cans are turned end over end into an upright position and are deposited on a descending elevator device J. The elevator lowers the upright cans to a predetermined level and places them on a discharge belt to be carried away to any suitable place of deposit for proper cooling.

In the machine illustrated in the drawings the can magazine A is located at one end of the machine (the left as viewed in Fig. 1) and is supported on top of a base member 31 (see also Fig. 4). The magazine is disposed over a rectangular shaped can entrance passageway or opening 32 formed in the top wall of a block 33 mounted on the base member 31 and comprises a plurality of vertically disposed rods 34 which are threaded into the wall section adjacent the sides and ends of the opening.

Cans entering the magazine A when properly fed are in a horizontal position with their ends containing the opening c, all facing one way and in a predetermined position, i. e., the ends facing the left as viewed in Figs. 1 and 2 and the openings disposed in the lower left hand corner as viewed in Fig. 8. Further, the closure element d of each can should be open as hereinbefore mentioned.

The can detecting device B is located adjacent the magazine A and is used to inspect the passing cans and detect the cans which are not properly positioned as described above.

Cans are fed from the bottom of magazine A in timed order by the carrier C. For this purpose the stack of cans at the lower end extends through the opening 32 in the top wall of the block 33 and into a trough or can guide 37 which is supported on top of the base member 31. The trough extends across the feed-in end of the machine (left as viewed in Figs. 1 and 2) with the can receiving end of the trough under the can magazine A.

The carrier C comprises a pair of spaced and parallel endless chains 41 (Figs. 4 and 11) having pairs of cooperating lugs 42 secured thereto at spaced intervals along their length. The height of these lugs is substantially equal to the height of a can b when on its side as shown. The chains extend transversely of the machine and their upper runs pass under the stack of cans, being guided in grooves 43 formed in the bottom of trough 37. The chains take over pairs of spaced sprockets 44 which are mounted on an idler shaft 45 located at one end of trough 37 and on a carrier drive shaft 46 which is disposed at the opposite end of the trough. Both of these shafts are carried in suitable bearings formed in the base member 31.

The chains 41 of carrier C move through trough 37 with a step by step or intermittent motion. This is effected by rotation of the drive shaft 46 as by a can timing or Geneva disc 47 (Figs. 3 and 11) mounted thereon. The disc is intermittently rotated and for this purpose carries spaced cam rollers 48 which are engaged successively by a driving cam 49 mounted on a continuously rotating main driving shaft 51 journaled in bearings 52 formed in base member 31. Main shaft 51 is in turn rotated through a gear and chain connection 53 (Fig. 1) by an electric motor 54. The motor constitutes the main driving element of the machine.

Every time the main driving shaft 51 makes one revolution, the cam 49 engages one of the rollers 48 on disc 47 and turns the disc and its shaft 46 through a partial rotation. There are preferably six rollers 48 so that the main shaft makes six revolutions to one rotation or cycle of the disc. The purpose of this will be made evident as the description proceeds.

As an advancing pair of lugs 42 of the carrier

C moves adjacent the lower end of the can magazine A the lugs engage the lowermost can resting on the bottom of trough 37 and move it sideways from the stack, toward the left in Fig. 4. The same lugs that engage the can when moved beneath the stack provide a support for the remaining cans in the stack. The lugs 42 are elongated so that this supporting action will continue for an appreciable period of time. This support is necessary by reason of the action of the detecting device B which will soon be described in detail.

As soon as the lugs move out from beneath the stack all of the cans in the stack drop the space of a can and the lowermost can falls into the trough 37, unless feeding of cans is prevented by the detector device B.

Before further discussing the step advancement of the cans with the carrier C, consideration will be given to the operation of the detecting device B which operates when a can is improperly positioned in the magazine A or when its closure element $d$ is not in the required open position.

The first step in the detection of improperly conditioned cans relates to the interruption of a light beam passing into a photo-electric cell and reference should now be had to Figs. 8 and 9. The photo-electric detector device is indicated broadly by the numeral 55 and includes a photo-electric cell 56 disposed on one side of the can magazine A (see also Fig. 5). A light source or lamp 57 is disposed on the opposite side of the magazine and is adapted to throw a controlled beam of light across the path traversed by the open hinged closure element $d$.

As long as the can hinged elements $d$ are fully open, as shown in the four lowermost cans $b$ in Fig. 8, the beam of light passing from the lamp 57 is interrupted by the hinged closure elements and is prevented from entering the photo-electric cell 56. This dark cell condition obtains when the detector device B is dormant, this being when the cans are passing normally through the magazine and are being further conveyed from the bottom of the stack by the carrier C as just described.

When a closure element $d$ is not in proper position, as illustrated in the second can $b$ from the top in Fig. 9, the controlled beam of light passing from the lamp 57 enters into the photo-electric cell 56 and activates the detector device 55 to prevent further feeding of cans through the magazine A. A misplaced can, such as the top can shown in Fig. 9, would have the same effect, as light could still strike the cell 56.

The detector device 55 also includes a conventional photo-electric cell relay unit having a switch element 58 (Fig. 10). Wires 61, 62 leading from any suitable source of electrical energy pass into the relay unit and through the various elements connected with the internal circuits thereof. Since such internal construction is common in this class of instruments and in order to simplify the description of the operation of the detector device B further reference will not be made to the standard internal features. For the present purpose it is only necessary to state that the switch element 58, which is influenced by activating the photo-electric cell 56, remains closed as long as the photo-electric cell unit is dormant without light entering the cell 56. This switch is included in and affects circuits which will now be considered in detail.

With switch 58 closed current flows therethrough in a switch holding circuit R. This circuit includes a main supply wire 63 and a main return wire 64 which lead from any suitable source of electrical energy. A service switch 65 may be connected into the two wires 63, 64 for cutting off current when the machine is not in operation.

Main supply wire 63 passes into the photo-electric detector device 55 and connects with a terminal 66. A second terminal 67 is also provided adjacent the terminal 66 and it is these terminals that are bridged when the switch 58 is closed. The terminal 67 is connected by a wire 68 to the coil of a solenoid 69 the opposite end of the coil being connected to the main return wire 64.

As long as holding circuit R is unbroken the solenoid 69 is energized. This solenoid is of the double pole type and contains two movable contact members. One of the movable contact members, designated by the numeral 71, is associated with a feed stop solenoid circuit S and when the solenoid 69 is energized, engages a contact 72 which is connected by a wire 73 to the main service wire 63. The opposite end of movable member 71 is connected by a wire 74 to the winding of a feed stop solenoid 75 the opposite end of the winding being connected by a wire 76 to the main return wire 64. The feed stop solenoid 75 remains energized throughout normal feeding conditions being so maintained by the feed stop solenoid circuit S which in its turn is held by the holding circuit R.

When the controlled light beam passing from the lamp 57 enters the photo-electric cell 56 the switch 58 breaks the connection between the terminals 66, 67 of the holding circuit R. Such a condition results, it will be recalled, when the detecting device B is activated by an improperly placed can or a can having its closure member $d$ in other than in proper open position. Provision is made, however, for preventing immediate or untimed de-energizing of the solenoid 69 by reason of the breaking of the holding circuit R.

This provision includes a timing circuit T and a mechanically operated switch 81. Switch 81 is adapted to close a contact with the end of a wire 82 which connects with the main service wire 63. The switch is also connected by a wire 83 to wire 68. Even with the holding circuit R broken by opening of the switch 58 as long as switch 81 of the timing circuit T is closed, electrical energy will flow from the main service wire 63 through wire 82, switch 81, wire 83 and wire 68 into the winding of the solenoid 69 and thus maintain the solenoid energized.

Breaking of the timing circuit T by opening of the switch 81 is so timed that the solenoid 69 will be de-energized only when a pair of lugs 42 of the conveyor C is in a definite position relative to the bottom of the magazine. However, when the solenoid 69 is de-energized the solenoid circuit S is broken and the feed stop solenoid 75 is also de-energized. Consideration will now be given to the mechanical breaking of the switch 81 and to the results of de-energizing of the solenoid 75. This is, of course, for the purpose of stopping feeding of the cans from the bottom of the magazine.

The switch 81 is periodically opened and at the proper time by a cam 84 (Fig. 5) which is mounted on a short shaft 85 journaled in bearings formed in the block 33 (see also Fig. 7). The cam is driven from the idler shaft 45 by a sprocket and chain connection 86. Projections 87 on the cam 84 engage an arm of the switch 81, the latter being also mounted on the block 33 and directly above the cam.

The solenoid 75 (Figs. 4 and 5) is carried on a bracket 91 which is mounted on the block 33. This solenoid is provided with a vertically movable core 92 the lower end of which is connected by a link 93 to one arm 94 of a bell crank lever 95. Core 92 is normally maintained energized and in its lowermost position against the tension of an internal spring as illustrated in Fig. 4, under normal operating conditions. Lever 95 is mounted on a short cross shaft 96 carried in bearings formed in the block 33. Another arm 97 of the bell crank lever extends down through a slot 98 formed in the top wall of the block 33. This arm at its outer end is shaped as a ball section which engages within a socket 99 formed in the outer end of a slide 101.

Slide 101 is carried in guideways 102 formed in the block 33. The inner end of the slide is formed with a thin projecting shelf section 103 which is adapted to be inserted under the stack of cans in the magazine A when the slide is moved forward by a de-energizing action of the solenoid 75. It will now be evident why the timing circuit T is brought into play since improper feeding conditions may occur in different ways within magazine A and such conditions are immediately detected by the detecting device B.

This forward timed movement of the slide prevents damage to the cans. Placing of the shelf section 103 across the path of the cans moving through the magazine prevents feeding of the cans. The carrier C, however, continues its intermittent step movement and as long as the cans are held in the magazine, the carrier will not pick up the lowermost can and empty spaces between the chain lugs 42 will result.

Reference has already been made to the supporting of the stack of cans in the magazine A by the elongated lugs 42 of the chain 41. The timing of the movement of the slide 101 also insures that those cans remaining in the magazine A, after removal of the bottom can, be supported by the passing lugs 42 until the shelf section 103 of the slide is in supporting position.

This is important for another reason. The switch 81 is periodically closed irrespective of the magazine conditions. While an improperly placed or improperly opened can is being removed many closing cycles of the switch 81 may take place. During such time the slide 101 will be frequently withdrawn since both solenoids 69, 75 are momentarily and periodically energized. The stack of cans at such time, however, will be supported first by the lugs 42 and then by the shelf section 103 until normal conditions have been restored in the magazine.

In addition to the movement of the slide 101 by de-energizing of the solenoid 75 the operator is warned of the fact that improper conditions obtain in the magazine. This warning is given by the ringing of a bell the circuit of which is closed when the solenoid 69 is de-energized. Referring to Fig. 10 it will be observed that there is provided a bell 105 which is connected by a wire 106 to the service wire 63. A wire 107 connects the other side of the bell to the second of the movable contact members of the solenoid 69, this second member being indicated by the numeral 108.

Upon de-energizing of the solenoid 69 the movable contact member 108 is brought down upon a terminal 109 which is connected to the return wire 64. This completes the bell circuit. In this circuit current flows through wires 63, 106 through the coil of the bell 105, wire 107, movable contact member 108 of the solenoid 69, contact 109 and wire 64. The bell continues ringing as long as the solenoid 69 is de-energized.

The cans upon separation from the magazine move through the trough 37 as they are advanced step by step, toward the left as viewed in Fig. 4. When six cans or corresponding spaces, empty or in part empty, come to rest ready for the cans to be inserted in the can receiving instrumentalities or pockets D the lifter devices E become effective. There are two lifter devices E, one a duplicate of the other and both operate as a single unit.

Each lifter device E comprises a front member 120 (Fig. 11) and a back member 121 (see also Fig. 4) held in spaced parallel relation by a connecting horizontal web 122. The top of each member 120, 121 is wide enough to extend beneath three can spaces of the carrier chain C and have vertical movement through slots 123 cut in the floor of the trough 37.

The front and back members of each device are formed at the top into three spaced can engaging lugs 124. The two devices considered together, therefore, provide for lug engagement of six cans. Six cans are lifted together by the two lifting devices E, i. e., if the carrier spaces are all filled with cans.

Each lifter device E has vertical movement in front and rear slideways 127. Each rear slideway is formed in a depending plate 128 of trough 37 and each front slideway in a casing 129 which is bolted in place in an opening 131 in a web section 132 of the base member 31.

Each lifter is moved by cam action. For this purpose the bottom web 122 of each lifter is connected by a link 135 (Figs. 4 and 11) to one end of a cam arm 136 (see also Fig. 3). Each arm is mounted on a short shaft 137 carried in a bearing 138 formed in base member 31. The opposite end of each arm carries a cam roller 141 which operates within a cam groove 142 of a cam 143. The two cams 143 are keyed to a long sleeve 145 which is loosely carried on the main driving shaft 51.

A can lifting cycle for the lifting devices E corresponds in time to one revolution of the intermittently moved disc 47 (Figs. 3, 11 and 12). At the completion of a cycle the sleeve 145 is rotated in time with the continuously rotating main shaft 51. To obtain such rotation the sleeve is momentarily connected to the shaft by means of a clutch 151 (Figs. 3, 13 and 14).

The clutch includes a driving member 152 which is pinned to main shaft 51 and a driven member 153 formed on one end of the sleeve 145. The driven member fits within the driving member and carries a pair of pivoted interengaging pawls 155, 156 disposed as shown in Figs. 13 and 14. A flat spring 157 located between the pawls tends to spread them apart. At times the spring causes the outer extermities of the pawls to engage into notches 158, 159 formed in the inner face of the clutch driving member 152 as shown in Fig. 13. This connects the driven member with the driving member.

Throughout the greater part of the can feeding cycle the driven member remains stationary while the driving member rotates. During this time the pawls 155, 156 are held depressed and out of engagement with their notches 158, 159 by a movable flapper 161 (Figs. 3, 13 and 14). The lower end of the flapper is formed with a curved foot 162 which engages against clutch pawl 155 to hold it depressed and the latter engages against pawl 156 and holds it in.

The upper end of the flapper 161 is mounted on a short shaft 164 carried in a bearing in a depending bracket 165 formed on the bottom of a cover plate 166 of base member 31. The flapper is moved into and out of pawl holding position by an arm 167. This arm is also mounted on shaft 164 and carries a cam roller 168 which operates within a cam groove 169 formed in a face of the can timing disc 47.

On the last step rotation of timing disc 47 as it completes a cycle or revolution, i. e., when the cans in conveyor C are properly aligned above the lifter devices E, a depression 171 in cam groove 169 in the disc moves arm 167 down (as viewed in Fig. 3). This shifts the flapper outwardly and releases its hold on the clutch pawls 155, 156. It is this action which permits the spring 157 to spread the pawls apart and to engage them into the notches 158, 159 thereby locking together the clutch driving member 152 and driven member 153. Thus the locked clutch members rotate in unison through one revolution and rotate sleeve 145 and lifter cams 143 through one revolution.

During a portion of this revolution and while the carrier C is stationary between its stepped movements, the rotating cams 143 rock the arms 136 and thereby raise the lifter devices E. Cans on the bottom of trough 37 and aligned over the lugs 124 of the lifter devices E are thereby raised vertically out of the trough. This action inserts the cans into the spaced and parallel longitudinal can receiving pockets D located just above. The cans are momentarily held in such an elevated position before the lifter devices begin to descend.

The can receiving pockets D are formed in an upper frame structure 173 (Figs. 1, 3, 4 and 11) which is carried on uprights 174 provided on top of the base member 31 the frame being located just above the trough 31. The sides of the pockets are lined with can guide plates 175 having top right-angle flanges 176 for confining inserted cans against upward displacement. Bottoms of the pockets are formed by pairs of transversely sliding horizontal plates or gates 177, 178 (see also Figs. 16, 17 and 18). Each pair of gates is adapted to be drawn apart to admit a can into a pocket and to be moved back into position again to support and confine a can after it is inserted into the pocket.

The forward end of each gate 177 or of gate 178 is supported on a ledge 179 formed along an upper edge of trough 37. The opposite or rear end of each gate 177 is secured to a slide bar 181 located in a slideway 182 formed in a top wall section 183 of trough 37. The rear end of each gate 178 is secured to a similar slide bar 184 located parallel to slide 181 in a slideway 185.

The slide bars 181, 184 are adapted to be reciprocated by cam action. Slide bar 181 is connected to one end of an arm 186 (Fig. 16) which is keyed to a sleeve 187 carried in a bearing 188 formed in base member 31. The sleeve also carries a cam arm 189 having at one end a cam roller 191 which operates within a groove 192 of a barrel cam 193 mounted on clutch sleeve 145.

Slide bar 184 is connected to one end of an arm 195 which is mounted on a shaft 196 loosely carried in sleeve 187. The shaft also carries a cam arm 197 having at one end a cam roller 198 which operates within a groove 199 of the barrel cam 193.

When the main shaft 51 rotates clutch sleeve 145 the cam 193 rocks the cam arms 189, 197 and thereby moves the slide bars 181, 184 in their slideways, the slides moving in opposite directions. It is this action that shifts the pairs of gates 177, 178 to spread them apart to admit the cans being lifted with the rising lifter devices E and to return them again to closed position under the inserted cans. It is only when the gates are closed on the cans that the lifter devices E descend to their original positions.

As hereinbefore mentioned sleeve 145 when connected by clutch 151 to the main shaft 51 makes one revolution or cycle and then is disconnected by action of clutch flapper 161. To prevent any over-throw of the cycle by the cams keyed to the sleeve, a brake 211 (Figs. 3 and 15) is provided to immediately stop rotation of the sleeve as soon as it is released. A brake drum 212 is keyed to sleeve 145 and this drum is encircled by a pair of brake arms 213. The arms are tied together at their upper ends by a pin 214. The lower ends of the arms are separated by a block 215, a spring-held bolt 216 passing through the block and through the ends of the arms providing a yieldable connection.

Block 215 is formed on the end of a short shaft 217 carried in a bearing 218 which is an integral part of a web of base member 31. Shaft 217 carries a lever 219 which is connected by a link 221 (see also Fig. 11) to the lower end of a vertically disposed cam lever 222. Lever 222 is mounted on a pivot pin 223 carried in a bracket 224 formed on web section 132 of base member 31. The upper end of the lever carries a cam roller 225 which operates against the rear face of timing disc 47. This is a usual brake construction operating at a given time to permit the brake arms 213 to grip the rotating brake drum 212 and thereby bring the latter to rest. This action is effected by engagement of cam roller 225 with a projection 226 formed on the rear face of timing disc 47.

Cans inserted in the can receiving pockets D are directly in front of and slightly above a can coating section of the machine which includes a main frame 231 (Figs. 1 and 2) one end of which is located adjacent the base member 31. The frame supports the reservoir or tank H containing melted or liquid paraffin 233. The paraffin is preferably introduced into the tank from any suitable sources of supply by way of a heat insulated pipe 234 which is threaded into a side wall of the tank. An overflow pipe 235 is also threaded in the tank wall, see also Fig. 21. A drain pipe 236 having a valve 237 is provided in the bottom of the tank for draining the latter when necessary. By arranging the overflow pipe at a certain level a constant predetermined level of paraffin can be maintained in the reservoir.

The paraffin in the tank H is maintained at a sterilizing temperature by a steam chamber 238 which surrounds the tank and which is enclosed in a heat insulated casing 239 supported by the main frame 231. Steam is circulated through the chamber by way of an inlet pipe 241 and by an outlet pipe 242. Both of these pipes are threaded into the casing bottom, one at each end of the casing.

The can runways F hereinbefore mentioned are located partially above and partially in the paraffin tank H and extend longitudinally thereof. The can entrance end of the runways is adjacent the can pockets D and in direct longitudinal alignment with them. These runways comprise spaced and parallel guide bars 245 which are arranged as shown in Figs. 2, 11, 19, 20 and 21 for guiding cans through the runways. The guide bars are held in position by brackets 246 which are spaced at intervals along their lengths. The brackets are bolted to cross members 247 which are mounted transversely of the main frame 231 and which are secured to the top thereof.

The guide bars 245 extend from the can pockets D where they are above the reservoir H, to a position down into the reservoir where they are immersed in the paraffin 233. An immersed section of the runway is twisted to effect a rotation along their longitudinal axes of cans passing therethrough. At the far end of the reservoir the guide bars curve sharply upward out of the reservoir and continue along an inclined path of travel as shown in Fig. 2.

Along the inclined section of the runways F the guide bar brackets 246 are secured to cross members 248 which are bolted to an auxiliary frame 249. The runways terminate near the top of this auxiliary frame. Auxiliary frame 249 is preferably supported partly on the delivery end of the main frame 231 and partly on a frame 251 of a subsequent machine which may be one of a continuous line of can treating machines.

Above each of the can runways F the endless chain conveyor G (Figs. 1, 2, 3, 4, 11 and 26) carries ring-like flights 256 which are secured at intervals along its length. Each conveyor is located above and in alignment with its corresponding can pocket D in front of the runway. At this end of the runway the conveyor takes over a sprocket 257 which is mounted on a drive cross-shaft 258 carried in bearings 259 formed in brackets secured to the upper frame structure 173. At the can delivery end of each runway each chain G takes over a sprocket 261 (see also Fig. 22) which is mounted on an idler cross-shaft 262 carried in bearings 263 formed in the auxiliary frames 249 at their upper ends.

The lower run of each of the conveyor chains G is guided in a track 265 (Figs. 1, 2, 4, 11, 19, 20 and 21) which is disposed over the top of its runway in parallelism therewith. These tracks are clamped to the cross-members 247, 248. The upper runs of the chains are similarly guided in track 266 which are clamped on top of the cross-members.

The conveyor chains are continuously driven by the main shaft 51 through a speed reduction chain and gear connection shown in Figs. 3 and 11. This connection includes a pinion 271 which is carried on the main shaft. The pinion meshes with a gear 272 mounted on a short shaft 273 carried in bearings 274 formed in the base member 31. A sprocket 275 also mounted on the short shaft 273 carries an endless chain 276 which takes over and drives a sprocket 277 mounted on one end of the conveyor drive shaft 258.

As the moving conveyor G brings a ring-like flight 256 down from the upper run of the conveyor to the lower run adjacent a can receiving pocket D, it sweeps through the pocket and engages against the filling end of the can deposited therein, pushing the can endwise out of the pocket into and through the aligning can runway F. The ring portion of the flight fits around the open closure element d of the can and prevents its accidental closing while the can is being moved. A finger 278 projecting outwardly from each flight prevents adjacent cans from coming into end to end engagement.

The can while in the runway passes down into the paraffin, first, being only partially submerged as shown in Fig. 19 so that the paraffin will flow into the interior of the can through its opening c. As the can moves further along the runway it passes through the twisted section where it is rotated on its longitudinal axis while at the same time it is more deeply immersed into the paraffin. The timing is such that the rate of rotation and immersion keeps the can opening c approximately half submerged in the substantially constant level of the paraffin as the can is advanced longitudinally so that air within the can is forced out as the paraffin flows in (see Figs. 19 and 20). This prevents the trapping of air in the can interior and insures a uniform coating of paraffin, free from air bubbles, on the inside walls of the can.

After approximately 180 degrees of rotation the can is completely submerged. Rotation of the submerged can is continued until its opening c is located at the lowest portion of the can as shown in Fig. 21. In this position, the can still being propelled by its conveyor flight 256, passes up out of the tank H along the inclined section of the runway. During this passage the excess paraffin from the interior of the can flows out through its opening c and drains back into the reservoir as shown in Fig. 25. A trough 279 secured to the auxiliary frame 249 is provided for returning the excess paraffin to the tank so that there is no appreciable loss above the amount remaining upon the surfaces of the can.

At the upper ends of the inclined sections of the runway F the drained cans are transferred to the elevator conveyor mechanism J which returns them to a lower level. There is one elevator for each runway F and it is located at the delivery end of its associated runway. Each elevator includes an endless chain 285 (Figs. 22 and 26) having spaced can carrying flights 286. The chain takes over upper and lower sprockets 287, 288 which are mounted on upper and lower shafts 289, 291. The lower shaft 291 is carried in bearings 292 formed in brackets 293 of a transverse tie bar 294. This tie bar is secured to opposite sides of the auxiliary frame 249. The upper shaft 289 is carried in bearings 296 formed in the auxiliary frame 249.

Upper shaft 289 is the drive shaft of the elevator conveyors and is continuously rotated through a gear and chain connection with conveyor shaft 262. Conveyor shaft 262 carries a sprocket 297 (see also Fig. 2) which drives an endless chain 298 connecting with a sprocket 299 freely mounted on a stud 301 carried in a boss 302 formed in the side of auxiliary frame 249. Sprocket 299 is secured to the side of a gear 303 which is also carried on stud 301. This gear 303 meshes with a gear 304 which is keyed to the upper sprocket shaft 289.

Provision is made for heating the elevator chains and the can flights to prevent chilling of the cans at the portions which engage the chains and flights and to also prevent accumulation of hardened paraffin on these parts. For this purpose the upward traveling run of the chains passes through an elongated tubular casing 307 which includes a steam chamber 308. Steam is circulated through this chamber by means of an inlet supply pipe 309 and an outlet or exhaust pipe 311, both of which are threaded into the rear wall of the casing 307.

In front of the downward traveling run of each elevator chain 285 there is located a set of four spaced and parallel vertical can guides 315. These guides are heated to prevent chilling of the sides of the cans. The upper ends of the two inner guides, i. e., those nearest the elevator chains 285, are inclined rearwardly as at 316 and merge into a curved section 317 which is adjacent the terminal end of the can conveyor guide bars 245. The curved section 317 merges into a depending straight section 318 connecting with a transversely disposed steam inlet supply pipe 319. The lower ends of these guides are bent rearwardly and connect with a steam outlet pipe 321.

The upper ends of the forward pair of can guides 315 extend straight up beyond the inclined section 316 of the rear guides and merge into a curved section 323 which connects with a steam inlet supply pipe 324. The lower ends of these guides are flared as shown in Fig. 22 to permit clearance for removal of the can from the elevator. These flared sections also extend rearwardly and connect with the steam outlet pipe 321.

Drained cans in runways F, while still being propelled by the ring-like can flights 256, upon reaching the ends of the runways ride over the curved sections 317 of the elevator can guides 315 and are thereby turned end over end into an upright position with their closure ends upward. The upright cans slide down the inclined sections 316 of the guides and land onto a descending flight 286 of the elevator chains 285 as shown in Fig. 26. The cans are thus lowered in a vertical position between the inner and outer can guides 315.

It has been found that a small accumulation of paraffin sometimes forms on the lower hinge edge of the closure element d of the drained cans b and this paraffin if not removed prevents proper sealing of the closure element d when the later is subsequently closed. Accordingly provision is made to remove this paraffin by a sharp blast of air which is directed against the hinge of closure elements d as the cans pass down through the can guides 315. This blast of air is issued from a small air nozzle 331 (Fig. 22) disposed between adjacent sets of can guides, serving both sets simultaneously.

The nozzle 331 is connected into an air supply pipe 332 which is normally closed off by a poppet valve 333 having a spring held stem 334. A cam 335 mounted on the end of the upper elevator sprocket shaft 289 adjacent the gear 304, depresses the valve stem 334 at the proper time to momentarily open valve 333 and thereby send a blast of air through the nozzles 331.

At the lower end of the elevator the cans are preferably deposited on a continuously moving endless belt 337 (Fig. 26) which carries them off to any suitable place of deposit. The belt takes over a pulley 338 which is mounted on a cross-shaft 339 carried in suitable bearings formed in auxiliary frame 249. The shaft may be driven in any suitable manner in time with the other moving parts of the machine or may be actuated from and in time with a subsequent machine as desired.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A machine for coating cans, comprising in combination a reservoir for holding a coating liquid, means for heating said liquid to a sterilizing temperature, a runway extending into said reservoir for guiding cans endwise into and through the heated liquid, said runway being twisted to rotate the cans on their longitudinal axes while they are in the liquid for uniformly spreading the same over the surfaces of the cans, an inclined continuation of said runway rising out of the reservoir for shifting the coated cans endwise into an inverted position to drain them of excess liquid, and a conveyor for propelling the cans therealong.

2. A machine for coating cans, comprising in combination a reservoir for holding a coating liquid, a runway extending into said reservoir for guiding cans endwise into and through the liquid, said runway being twisted to rotate the cans on their longitudinal axes while they are in the liquid for uniformly spreading the same over the surfaces of the cans, an inclined continuation of said runway rising out of the reservoir for shifting the coated cans endwise into an inverted position to drain them of excess liquid, a trough disposed under said inclined continuation of said runway for returning the excess liquid to the reservoir, and a conveyor for propelling the cans therealong.

3. A machine for coating cans having an opening in an end thereof and a closure element attached to the can end, comprising in combination a reservoir for holding a coating liquid, a runway extending into said reservoir for guiding cans endwise into and through the liquid, said runway being twisted to rotate the cans on their longitudinal axes while they are in the liquid, and a conveyor mounted for operation adjacent said runway for propelling the cans through said runway for coating liquid, said conveyor having flights for projecting into said runway and for engaging against the open end of the cans the while holding open said closure elements to insure filling of said cans with liquid through said opening during their advancement and rotation for uniformly spreading the coating over the interior and exterior surfaces of the cans.

4. A machine for coating cans having an opening in an end thereof and a closure element attached to the can end, comprising in combination a reservoir for holding a coating liquid, a runway extending into said reservoir for guiding cans endwise into and through the liquid, said runway being twisted to rotate the cans on their longitudinal axes while they are in the liquid, a conveyor for moving the cans in said runway, said conveyor having ring-like flights adapted to project into said runway for engaging against the open end of the cans to surround the closure elements and to hold them open during advancement and rotation of the cans to insure filling of the cans with said coating liquid through their end openings, and fingers extending rearwardly from said flights for spacing adjacent cans during their passage through the runway to prevent accidental crushing of the closure elements.

5. A machine for coating cans, comprising in combination a can magazine, a can receiving instrumentality, a can carrier device for removing cans individually from the bottom of said magazine and for aligning a said can with said can receiving instrumentality, elements adjacent said can carrier device for inserting an aligned can into said receiving instrumentality, a reservoir adjacent said can receiving instrumentality for holding a coating liquid, a conveyor for removing a can from said receiving instrumentality and for moving it through said reservoir, and a runway having a can receiving end in alignment with said receiving instrumentality for guiding said can into and through the coating liquid.

6. A machine for coating cans, comprising in combination a can magazine, a plurality of elevated spaced and parallel can receiving instrumentalities arranged in a row and extending transversely of the machine, can carrier devices for removing cans individually from the bottom of said magazine and for arranging them in a row under said receiving instrumentalities and in vertical alignment therewith, lifter elements adjacent said carrier devices for simultaneously raising the cans as a row into their respective receiving instrumentalities, a reservoir adjacent said can receiving instrumentalities for holding a coating liquid, a plurality of spaced and parallel synchronized conveyors aligning with said can receiving instrumentalities and extending longitudinally of said reservoir for removing cans from their receiving instrumentalities and for moving them through said reservoir, and a plurality of spaced and parallel runways longitudinally aligned with said conveyors and with said receiving instrumentalities for receiving the moving cans and for guiding them into and through the coating liquid.

7. A machine for coating cans having an opening in an end thereof and a closure element attached to the can end, comprising in combination a magazine for retaining the cans in stack formation, devices for feeding cans from said magazine, a reservoir for holding a coating liquid, a conveyor for moving the fed cans through the liquid of said reservoir while holding their closure elements open, a runway mounted adjacent to and extending into said reservoir for guiding the moving cans into and through the coating liquid while retaining them in a predetermined position so that the liquid will flow into the cans through said end opening for coating their interior while the surrounding liquid of said reservoir coats their exterior surfaces, means for detecting while in said magazine improperly positioned cans and cans in which the closure elements are not fully open, and members actuated by said detecting means for nullifying said feeding devices to prevent feeding of cans from said magazine.

8. A machine for coating cans having an opening in an end thereof and a closure element attached to the can end, comprising in combination a magazine for retaining the cans in stack formation, devices for feeding cans from said magazine and for advancing them to a predetermined position, a reservoir for holding a coating liquid, a conveyor for moving the advanced cans from said predetermined position through said reservoir, said conveyor having flights for holding open said closure elements so that the liquid will flow into the cans through their openings for coating the interior while the surrounding liquid of said reservoir coats the exterior can surfaces, and means located in said reservoir for shifting the coated cans on their longitudinal axis to bring their openings into a lowermost position for draining the excess liquid.

9. A machine for coating cans, comprising in combination, a reservoir for holding a coating liquid, a twisted runway extending into said reservoir for guiding cans into and through the liquid and for rotating them on their longitudinal axes while they are in the liquid to uniformly spread the liquid over the surfaces of the cans, an inclined continuation of said runway rising out of the reservoir for draining the excess liquid from the cans, a conveyor for propelling the cans therealong, and an elevator adjacent the end of said inclined continuation of said runway for delivering the drained cans at a lower level.

10. A machine for coating cans, comprising in combination, a reservoir for holding a coating liquid, a twisted runway extending into said reservoir for guiding cans endwise into and through the liquid and for rotating them on their longitudinal axes while they are in the liquid to uniformly spread the liquid over the surfaces of the cans, an inclined continuation of said runway rising out of the reservoir for shifting the coated cans endwise into an inverted position to drain the excess liquid from the cans, a conveyor for propelling the cans therealong, means for turning the inverted cans into an upright position, and an elevator adjacent the end of said inclined continuation of said runway for delivering the drained cans at a lower level.

11. A machine for coating cans having a hinged closure element, comprising in combination, a reservoir for holding a coating liquid, a conveyor for immersing the cans into said coating liquid to uniformly spread the liquid over the surfaces of the cans and over their hinged closure elements said conveyor also removing the cans from said reservoir while draining the liquid from the cans and from their hinged closure elements, and devices including an air blast for removing any liquid accumulation on said hinge closure element of the drained cans in order to facilitate proper subsequent closing of said element.

12. An elevator for use in a can treating machine, the combination of an elevator conveyor for delivering hot cans from one level to another, means for heating said elevator conveyor, guide rails for retaining said hot cans in a path of travel while moved by said elevator conveyor, and means for heating said guide rails to delay cooling of said hot cans during their movement.

13. An elevator for use in a machine for coating cans with a hot liquid, the combination of an elevator conveyor for delivering the hot cans from a high level to a lower level, means for heating said elevator conveyor, guide rails for retaining said hot cans in a controlled path of travel, said guide rails being adapted to receive the hot cans in an inverted position and to turn them into an upright position, and means for heating said guide rails to delay cooling of said hot cans during delivery.

14. In an elevator for a machine for coating cans with a hot liquid, such cans having a hinged closure element, the combination of an elevator conveyor for delivering the hot cans from a high level to a lower level, means for heating said conveyor, rails for guiding said hot cans while carried by said elevator conveyor, means for heating said guide rails to delay cooling of said hot cans during delivery, and devices for removing liquid accumulated at the hinge closure element of said cans while they are in said elevator to facilitate proper subsequent closing of said hinge closure element.

JOHN M. HOTHERSALL.
GEORGE C. REID.